United States Patent
Gibbons

[19]

[11] Patent Number: 5,803,518

[45] Date of Patent: Sep. 8, 1998

[54] TANDEM AXLE TRAILER PIN LEVERAGE HANDLE SYSTEM

[76] Inventor: Brian Scott Gibbons, 19 Cherry St., Montrose, Pa. 18801

[21] Appl. No.: 771,473

[22] Filed: Dec. 23, 1996

[51] Int. Cl.⁶ .................................................. B66F 3/00
[52] U.S. Cl. ........................... 294/18; 294/17; 254/129; 254/131; 280/433
[58] Field of Search ................. 294/15, 17, 18, 294/19.1, 24, 26; 254/129, 131; 280/433

[56] References Cited

U.S. PATENT DOCUMENTS

| | | | |
|---|---|---|---|
| 1,815,220 | 7/1931 | Strong | 254/131 |
| 3,164,893 | 1/1965 | Ashworth | 254/131 |
| 3,644,951 | 2/1972 | Colburn | 294/24 |
| 3,843,981 | 10/1974 | Verest | 294/24 |
| 4,050,107 | 9/1977 | Parma | 294/24 |
| 4,251,089 | 2/1981 | Skaggs | 280/433 |
| 4,531,274 | 7/1985 | Sanders | 294/18 |
| 5,003,680 | 4/1991 | Vesley et al. | 294/17 |
| 5,344,201 | 9/1994 | Offin | 294/24 |
| 5,378,007 | 1/1995 | Joyce | 280/433 |
| 5,423,567 | 6/1995 | Upton | 294/17 |

Primary Examiner—Dean Kramer

[57] ABSTRACT

A new Tandem Axle Trailer Pin Leverage Handle System for facilitating the extraction of a tandem axle trailer pin for repositioning of the axles of the tandem axle trailer. The inventive device includes an elongated handle, a first and second plate secured distally apart to the handle, an elongated rod pivotally attached mesial the plates, and a hooked end secured to the rod opposite of the plates for engaging the tandem axle trailer pin. Preferably, there is a first aperture and a second aperture projecting traversely through the plates for allowing selective positioning of the rod for older style trailers or modern style trailers. The end of the handle engages a trailer box simultaneously as the hooked end engages the pin thereby leveraging upon the pin for extracting a frozen or rusted pin.

12 Claims, 3 Drawing Sheets

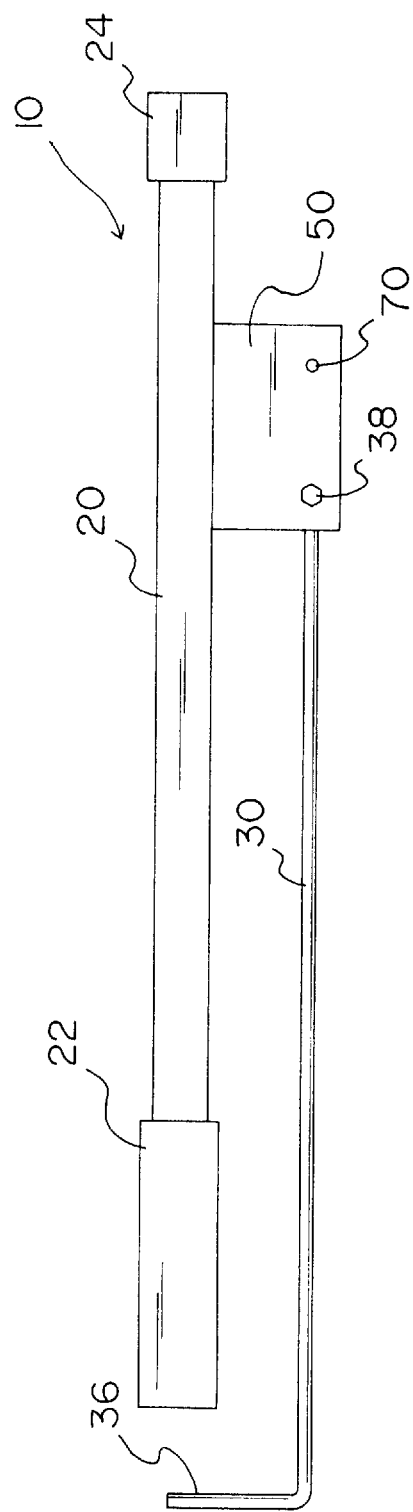
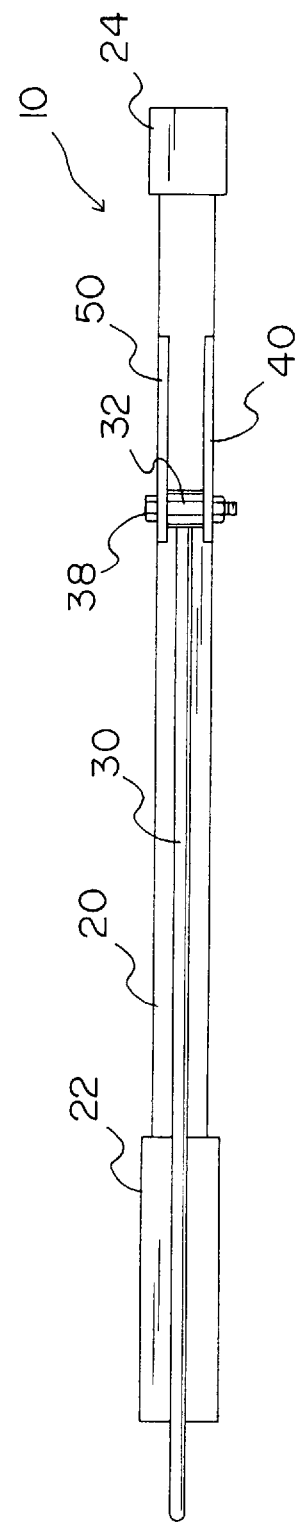
FIG. 1
FIG. 2

TANDEM AXLE TRAILER PIN LEVERAGE HANDLE SYSTEM

BACKGROUND OF THE INVENTION

1. Field of the Invention

The present invention relates to Trailer Pin Removal Devices and more particularly pertains to a new Tandem Axle Trailer Pin Leverage Handle System for facilitating the extraction of a tandem axle trailer pin for repositioning of the axles of the tandem axle trailer.

2. Description of the Prior Art

The use of Trailer Pin Removal Devices is known in the prior art. More specifically, Trailer Pin Removal Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Trailer Pin Removal Devices include U.S. Pat. Nos. 5,201,559; 5,065,488; U.S. Des. Pat. No. 330,494; U.S. Pat. Nos. 4,050,107; 5,326,144 and 5,344,201.

While these devices fulfill their respective, particular objectives and requirements, the aforementioned patents do not disclose a new Tandem Axle Trailer Pin Leverage Handle System. The inventive device includes an elongated handle, a first and second plate secured distally apart to the handle, an elongated rod pivotally attached mesial the plates, and a hooked end secured to the rod opposite of the plates for engaging the tandem axle trailer pin.

In these respects, the Tandem Axle Trailer Pin Leverage Handle System according to the present invention substantially departs from the conventional concepts and designs of the prior art, and in so doing provides an apparatus primarily developed for the purpose of facilitating the extraction of a tandem axle trailer pin for repositioning of the axles of the tandem axle trailer.

SUMMARY OF THE INVENTION

In view of the foregoing disadvantages inherent in the known types of Trailer Pin Removal Devices now present in the prior art, the present invention provides a new Tandem Axle Trailer Pin Leverage Handle System construction wherein the same can be utilized for facilitating the extraction of a tandem axle trailer pin for repositioning of the axles of the tandem axle trailer.

The general purpose of the present invention, which will be described subsequently in greater detail, is to provide a new Tandem Axle Trailer Pin Leverage Handle System apparatus and method which has many of the advantages of the Trailer Pin Removal Devices mentioned heretofore and many novel features that result in a new Tandem Axle Trailer Pin Leverage Handle System which is not anticipated, rendered obvious, suggested, or even implied by any of the prior art Trailer Pin Removal Devices, either alone or in any combination thereof.

To attain this, the present invention generally comprises an elongated handle, a first and second plate secured distally apart to the handle, an elongated rod pivotally attached mesial the plates, and a hooked end secured to the rod opposite of the plates for engaging the tandem axle trailer pin.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Tandem Axle Trailer Pin Leverage Handle System apparatus and method which has many of the advantages of the Trailer Pin Removal Devices mentioned heretofore and many novel features that result in a new Tandem Axle Trailer Pin Leverage Handle System which is not anticipated, rendered obvious, suggested, or even implied by any of the prior art Trailer Pin Removal Devices, either alone or in any combination thereof.

It is another object of the present invention to provide a new Tandem Axle Trailer Pin Leverage Handle System which may be easily and efficiently manufactured and marketed.

It is a further object of the present invention to provide a new Tandem Axle Trailer Pin Leverage Handle System which is of a durable and reliable construction.

An even further object of the present invention is to provide a new Tandem Axle Trailer Pin Leverage Handle System which is susceptible of a low cost of manufacture with regard to both materials and labor, and which accordingly is then susceptible of low prices of sale to the consuming public, thereby making such Tandem Axle Trailer Pin Leverage Handle System economically available to the buying public.

Still yet another object of the present invention is to provide a new Tandem Axle Trailer Pin Leverage Handle System which provides in the apparatuses and methods of the prior art some of the advantages thereof, while simultaneously overcoming some of the disadvantages normally associated therewith.

Still another object of the present invention is to provide a new Tandem Axle Trailer Pin Leverage Handle System for facilitating the extraction of a tandem axle trailer pin for repositioning of the axles of the tandem axle trailer.

Yet another object of the present invention is to provide a new Tandem Axle Trailer Pin Leverage Handle System which includes an elongated handle, a first and second plate secured distally apart to the handle, an elongated rod pivotally attached mesial the plates, and a hooked end secured to the rod opposite of the plates for engaging the tandem axle trailer pin.

Still yet another object of the present invention is to provide a new Tandem Axle Trailer Pin Leverage Handle System that increases the removal force applied to the pin than simply pulling directly upon the pin.

Even still another object of the present invention is to provide a new Tandem Axle Trailer Pin Leverage Handle System that makes the repositioning of tandem axles easier to accomplish.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a right side view of a new Tandem Axle Trailer Pin Leverage Handle System according to the present invention.

FIG. 2 is a bottom view of the present invention.

DESCRIPTION OF THE PREFERRED EMBODIMENT

Figure 3:
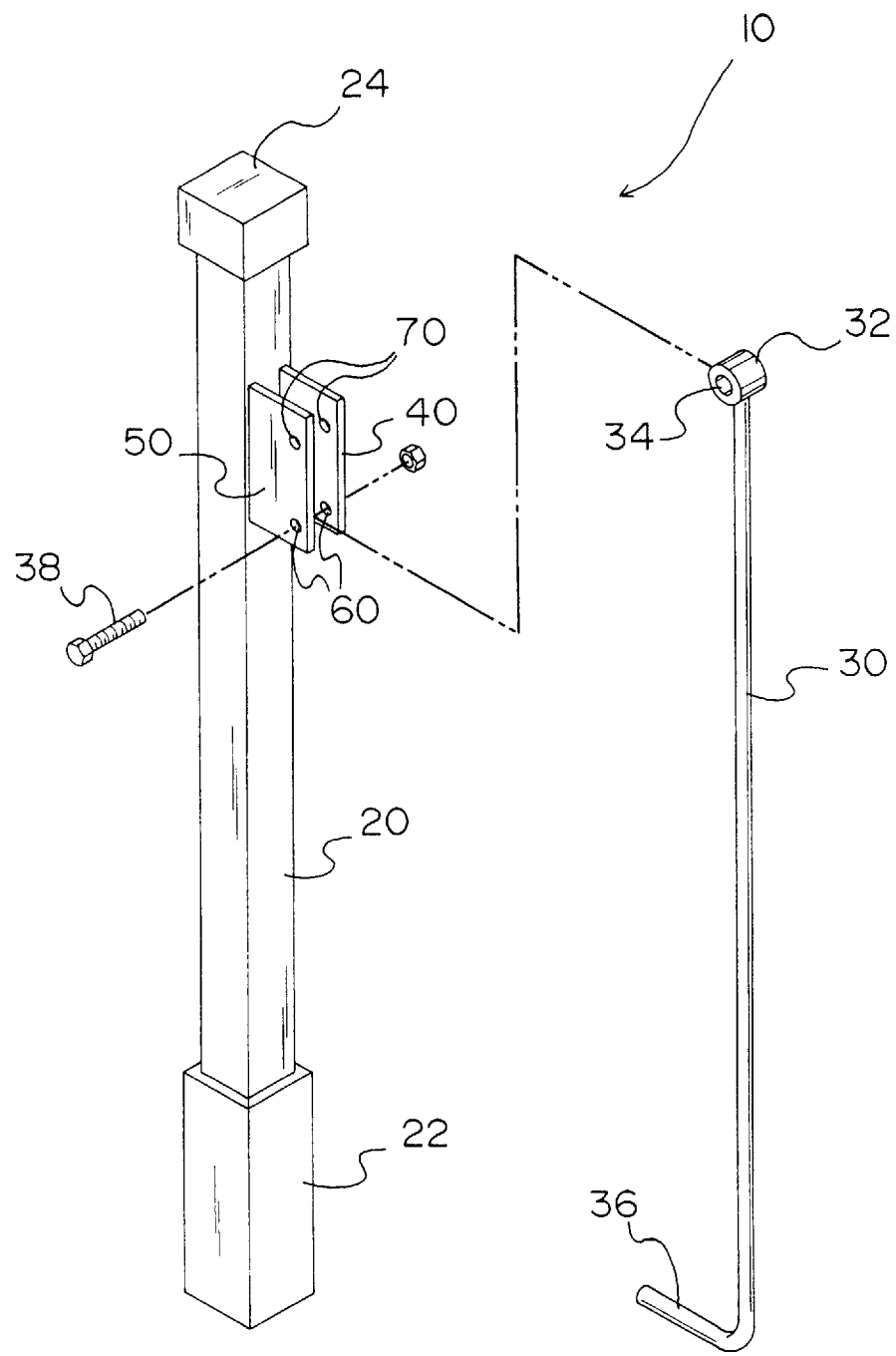
FIG. 3 is an upper perspective view of the present invention.
Figure 4:
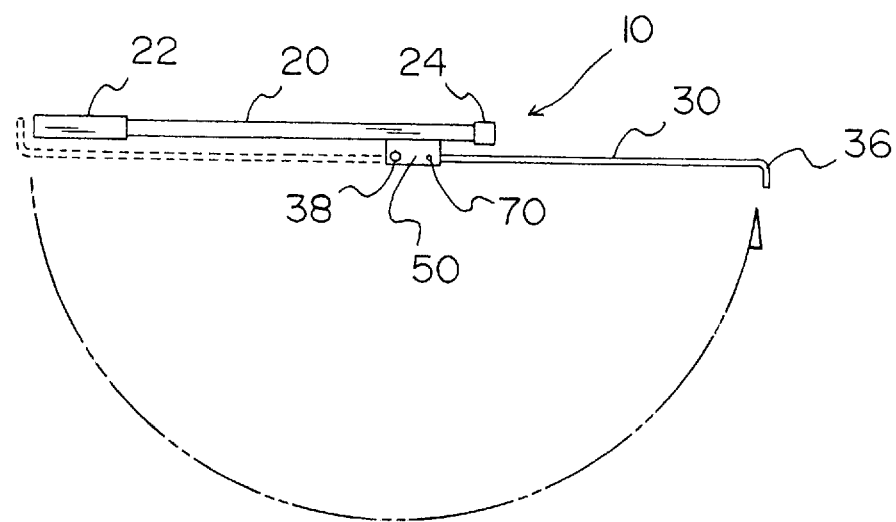
FIG. 4 is a right side view of the present invention in the extended and storage positions.

With reference now to the drawings, and in particular to FIGS. 1 through 5 thereof, a new Tandem Axle Trailer Pin Leverage Handle System embodying the principles and concepts of the present invention and generally designated by the reference numeral 10 will be described.

Figure 5:
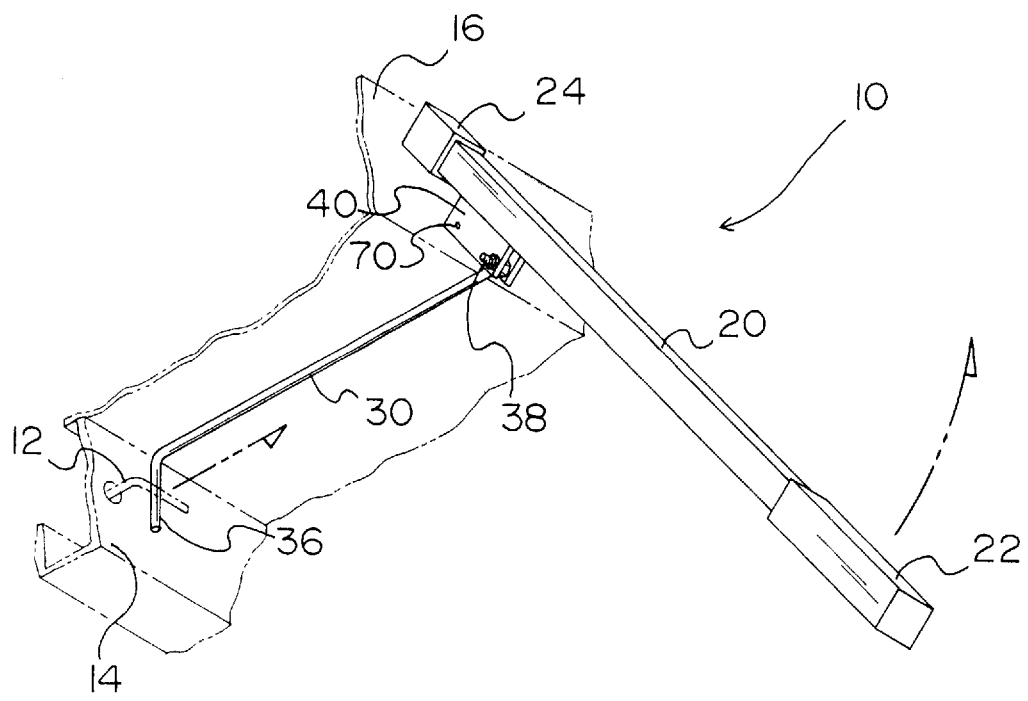
FIG. 5 is an upper perspective view of the present invention in operation.

More specifically, it will be noted that the Tandem Axle Trailer Pin Leverage Handle System 10 comprises an elongated handle 20 having a first end, a second end and a longitudinal axis. The elongated handle 20 preferably has a rectangular cross sectional area. The first end is for removably engaging a trailer box 16 for providing a leverage point as best shown in FIG. 5 of the drawings. Preferably, as shown in FIGS. 1 through 5 of the drawings, a gripping cap 24 is secured to the first end for providing increased gripping during utilization of the present invention. Preferably, as shown in FIGS. 1 through 5 of the drawings, a gripping member 22 is secured to the second end for providing gripping and comfort to a user's hand. A first plate 40 is secured to the elongated handle 20 near the first end projecting substantially radially to the longitudinal axis as best shown in FIGS. 1 through 3 of the drawings. A second plate 50 is secured to the elongated handle 20 near the first end a finite distance from the first plate 40 and parallel to the first plate 40 as best shown in FIG. 2 of the drawings. The plates 40, 50 preferably have a length of 4½ inches and a height of 2½ inches. A first aperture 60 projects through the first plate 40 and the second plate 50 traversely to the longitudinal axis as shown in FIG. 3 of the drawings. A second aperture 70 projects through the first plate 40 and the second plate 50 traversely to the longitudinal axis a finite distance along the longitudinal from the first aperture 60. The first aperture 60 and the second aperture 70 are preferably approximately 2 inches from the elongated handle 20. The first aperture 60 and second aperture 70 are preferably spaced apart by approximately 3 inches.

As shown in FIGS. 2 and 3 of the drawings, an elongated rod 30 secures a disc 32 having a third aperture 34 concentrically projecting through the disc 32. The elongated rod 30 is preferably approximately 22 inches in length. The disc 32 is pivotally secured mesial the first plate 40 and the second plate 50. A fastener 38 selectively projects through a selected aperture of the first plate 40 then through the third aperture 34 then through the corresponding aperture of the second plate 50. The selected aperture depends upon a style of the trailer box 16. The first aperture 60 is for a modern style of trailer boxes 16 and the second aperture 70 is for an older style of trailer boxes 16. The elongated rod 30 is preferably aligned parallel with a plane projecting through the longitudinal axis of the elongated handle 20 as best shown in FIG. 3 of the drawings. A hook 36 is secured to the elongated rod 30 opposite of the disc 32 for selectively engaging a tandem axle trailer pin 12 as best disclosed in FIGS. 3 and 5 of the drawings. The hook 36 preferably projects orthogonally to the elongated rod 30 towards the second end when in a storage position as shown in FIG. 1 of the drawings.

In use, the user selects the proper position of the elongated rod 30 within the plates 40, 50 determined by the style of the trailer box 16. Thereafter, the user engages the hook 36 to the pin 12 projecting through a frame 14 of the trailer box 16. The gripping cap 24 is positioned juxtaposed to the trailer box 16, as best shown in FIG. 5 of the drawings, where after the user applies force to the gripping member 22 secured to the elongated handle 20 opposite of the gripping cap 24. The leverage created by the elongated portion of the elongated handle 20 forces the pin 12 outwardly easily thereby allowing the user to move the tandem axles. The user locks the present invention in position by pivoting the elongated handle 20 past 180 degrees in relation to the elongated rod 30. This allows the user to retain the present invention maintaining the pin 12 in the desired position allowing the user to do various other tasks related to moving the tandem axle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tandem axle trailer pin leverage handle system comprising:

a substantially straight elongated handle having a first end, a second end and a longitudinal axis, wherein said first end is for removably engaging a trailer box for providing a leverage point, said elongated handle further having a pair of plates disposed therefrom positioned proximate said first end and parallel to said longitudinal axis;

an elongated rod pivotally secured between said plates, said rod aligned parallel with a plane projecting through said longitudinal axis of said elongated handle; and a hook secured to said elongated rod opposite of said elongated handle for selectively engaging a tandem axle trailer pin.

2. The tandem axle trailer pin leverage handle system of claim 1, further comprising a gripping cap, said gripping cap being secured to said first end for providing increased gripping during utilization.

3. The tandem axle trailer pin leverage handle system of claim 2, further comprising a gripping member, said gripping member being secured to said second end for providing gripping to a user's hand.

4. A Tandem Axle Trailer Pin Leverage Handle System comprising:

an elongated handle having a first end, a second end and a longitudinal axis, wherein said first end is for removably engaging a trailer box for providing a leverage point;

a first plate secured to said elongated handle near said first end projecting substantially radially to said longitudinal axis;

a second plate secured to said elongated handle near said first end a finite distance from said first plate and parallel to said first plate;

a first aperture projecting through said first plate and said second plate traversely to said longitudinal axis;

a second aperture projecting through said first plate and said second plate traversely to said longitudinal axis;

an elongated rod;

a disc having a third aperture concentrically projecting through and said disc secured to an end of said elongated rod;

said disc pivotally secured mesial said first plate and said second plate wherein a fastener selectively projects through a selected aperture of said first plate then through said third aperture then through said second plate, wherein said selected aperture depends upon a style of said trailer box, wherein said elongated rod is aligned parallel with a plane projecting through said longitudinal axis of said elongated handle; and a hook secured to said elongated rod opposite of said disc for selectively engaging a tandem axle trailer pin.

5. The Tandem Axle Trailer Pin Leverage Handle System of claim 4, including a gripping cap is secured to said first end for providing increased gripping during utilization.

6. The Tandem Axle Trailer Pin Leverage Handle System of claim 5, a gripping member secured to said second end for providing gripping to a user's hand.

7. The Tandem Axle Trailer Pin Leverage Handle System of claim 6, wherein said hook projects orthogonally to said elongated rod towards said second end when in a storage position.

8. The Tandem Axle Trailer Pin Leverage Handle System of claim 4, a gripping member secured to said second end for providing gripping to a user's hand.

9. The Tandem Axle Trailer Pin Leverage Handle System of claim 4, wherein said hook projects orthogonally to said elongated rod towards said second end when in a storage position.

10. A tandem axle trailer pin leverage handle system comprising:

an elongated handle having a first end, a second end and a longitudinal axis, wherein said first end is for removably engaging a trailer box for providing a leverage point, said elongated handle further having a pair of plates disposed therefrom positioned proximate said first end and parallel to said longitudinal axis;

an elongated rod pivotally secured between said plates, said rod aligned parallel with a plane projecting through said longitudinal axis of said elongated handle;

a hook secured to said elongated rod opposite of said elongated handle for selectively engaging a tandem axle trailer pin; and wherein said hook projects orthogonally to said elongated rod towards said second end when in a storage position.

11. The tandem axle trailer pin leverage handle system of claim 10, further comprising a gripping cap, said gripping cap being secured to said first end for providing increased gripping during utilization.

12. The tandem axle trailer pin leverage handle system of claim 11, further comprising a gripping member, said gripping member being secured to said second end for providing gripping to a user's hand.

* * * * *